Figure 1:
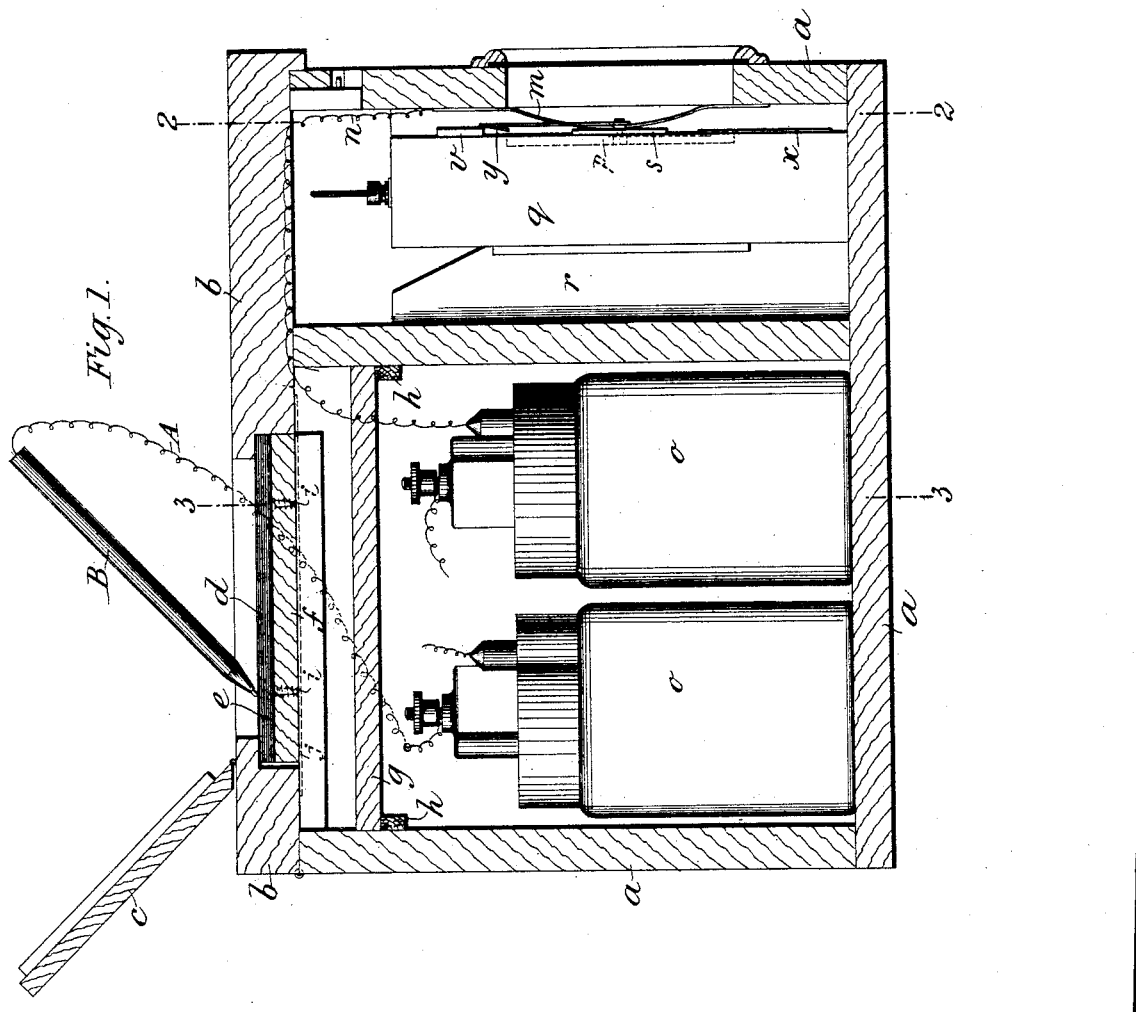

(No Model.) 6 Sheets—Sheet 1.
W. LUCAS & T. A. GARRETT.
EMPLOYÉ'S TIME RECORDER.

No. 470,810. Patented Mar. 15, 1892.

WITNESSES: INVENTORS:
Fred White William Lucas and
C. K. Fraser. Thomas Alexander Garrett,
By their Attorneys:
Arthur C. Fraser & Co.

THE NORRIS PETERS CO., PHOTO-LITHO., WASHINGTON, D. C.

(No Model.) 6 Sheets—Sheet 2.
W. LUCAS & T. A. GARRETT.
EMPLOYÉ'S TIME RECORDER.
No. 470,810. Patented Mar. 15, 1892.
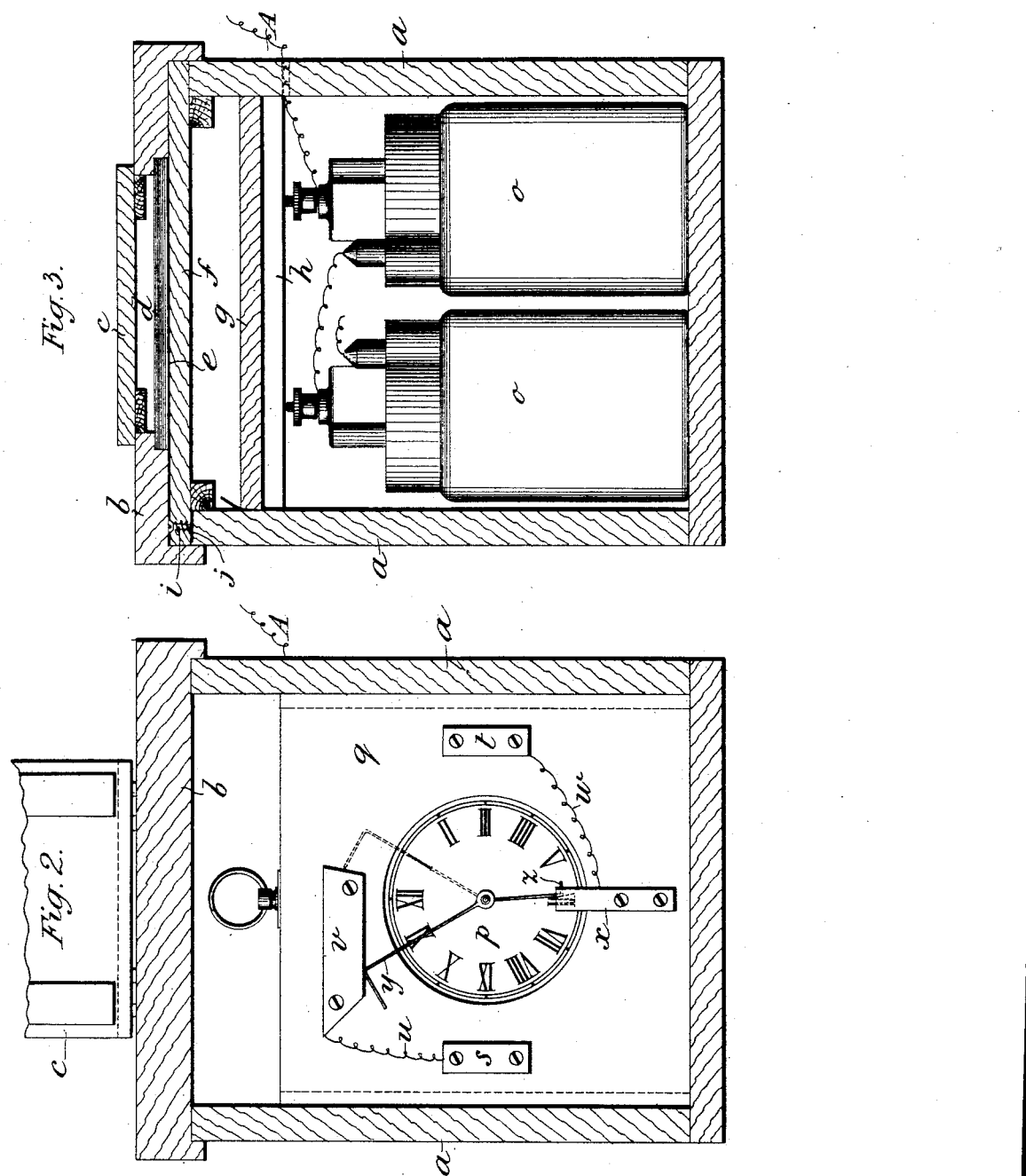
WITNESSES:
Fred White
C. K. Fraser
INVENTORS:
William Lucas
Thomas Alexander Garrett,
By their Attorneys
Arthur C. Fraser (No Model.) 6 Sheets—Sheet 3.
W. LUCAS & T. A. GARRETT.
EMPLOYÉ'S TIME RECORDER.
No. 470,810. Patented Mar. 15, 1892.
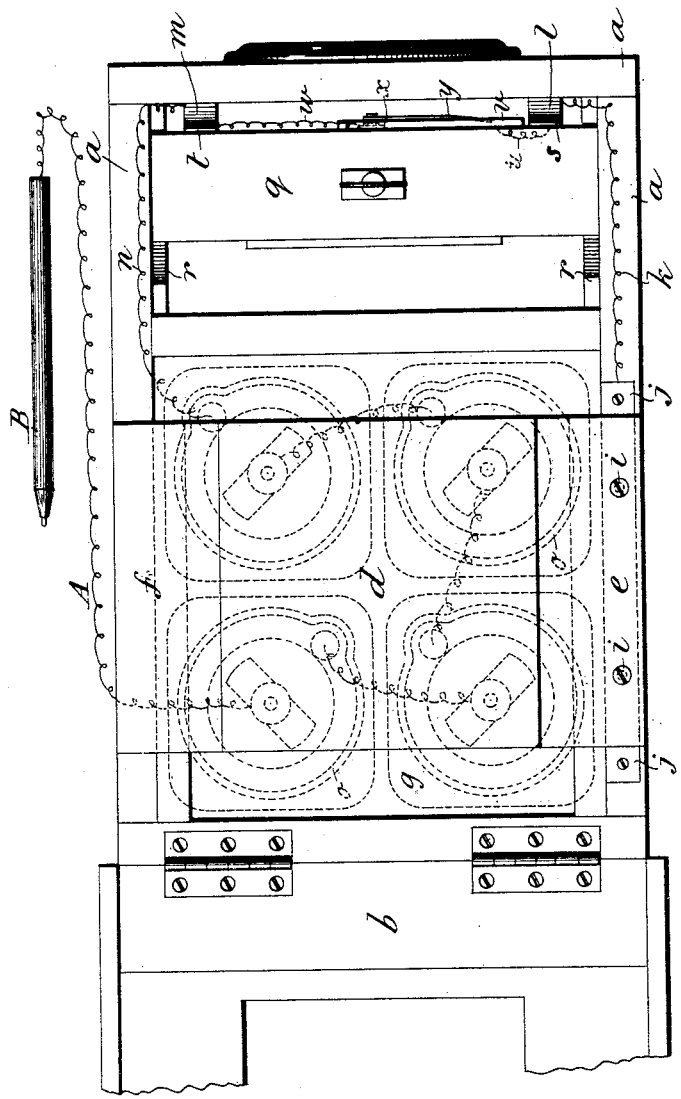
WITNESSES:
Fred White
C. K. Fraser
INVENTORS:
William Lucas and
Thomas Alexander Garrett,
By their Attorneys
Arthur C. Fraser & Co.

(No Model.) 6 Sheets—Sheet 4.
W. LUCAS & T. A. GARRETT.
EMPLOYÉ'S TIME RECORDER.
No. 470,810. Patented Mar. 15, 1892.
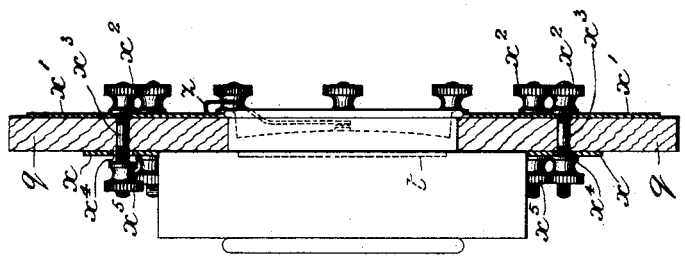
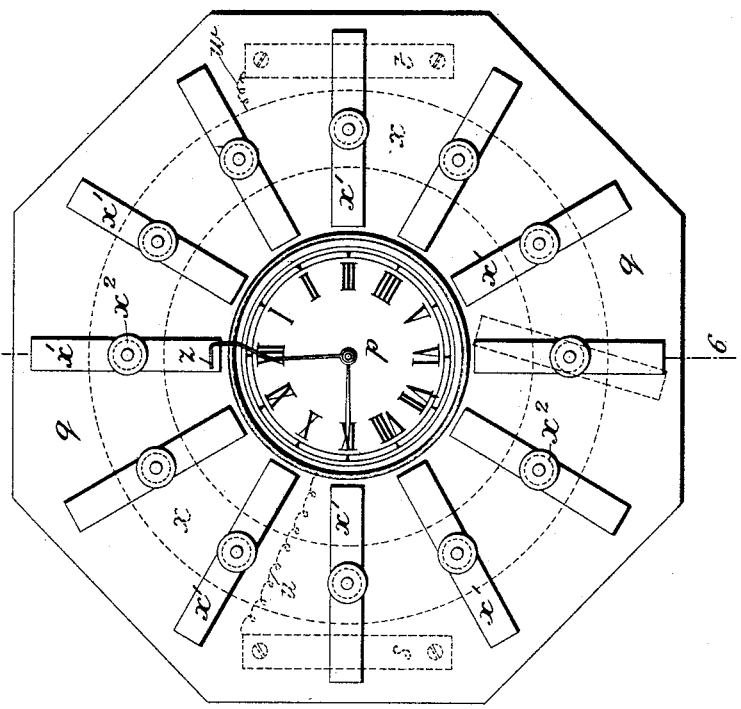

(No Model.) 6 Sheets—Sheet 5.
W. LUCAS & T. A. GARRETT.
EMPLOYE'S TIME RECORDER.
No. 470,810. Patented Mar. 15, 1892.
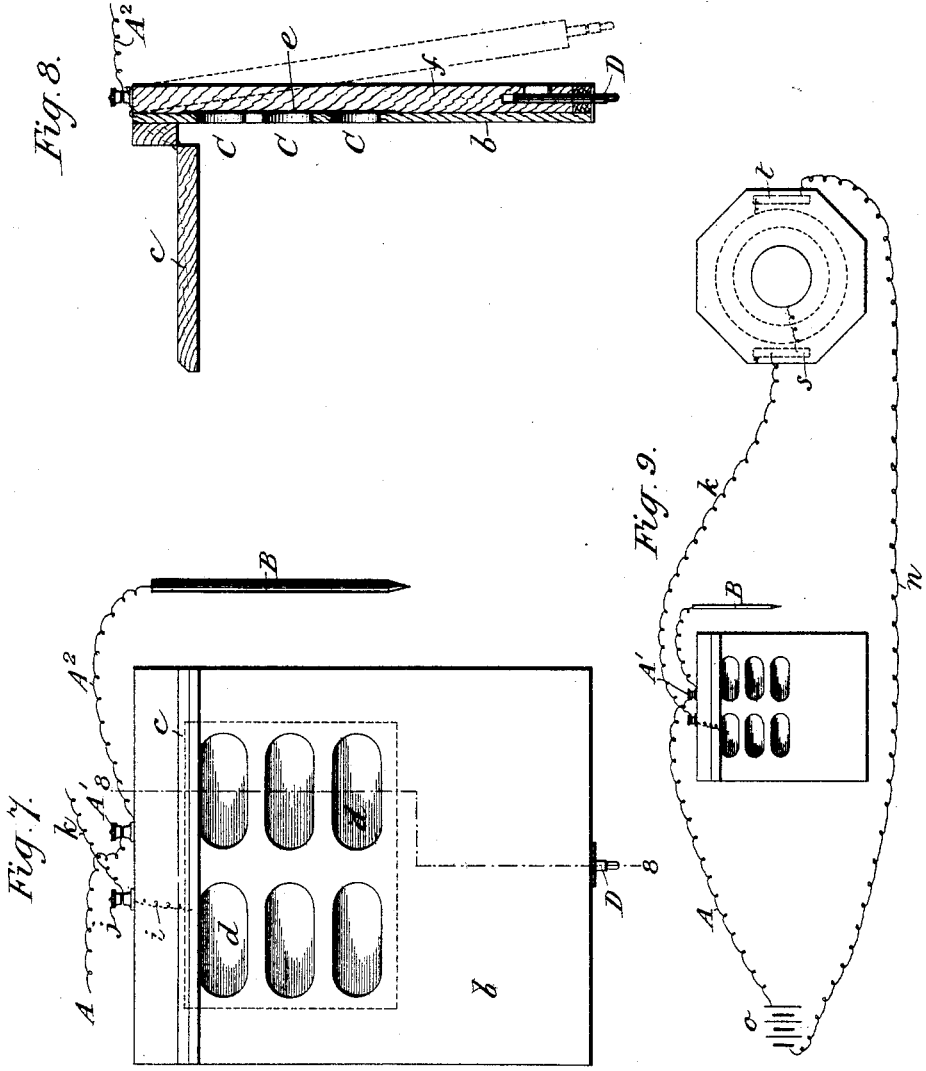

(No Model.) 6 Sheets—Sheet 6.

W. LUCAS & T. A. GARRETT.
EMPLOYÉ'S TIME RECORDER.

No. 470,810. Patented Mar. 15, 1892.

WITNESSES:
Fred White
C. K. Fraser

INVENTORS:
William Lucas and
Thomas Alexander Garrett,
By their Attorneys
Arthur C. Fraser

THE NORRIS PETERS CO., PHOTO-LITHO., WASHINGTON, D. C.

UNITED STATES PATENT OFFICE.

WILLIAM LUCAS AND THOMAS ALEXANDER GARRETT, OF LONDON, ENGLAND.

EMPLOYÉ'S TIME-RECORDER.

SPECIFICATION forming part of Letters Patent No. 470,810, dated March 15, 1892.

Application filed April 21, 1891. Serial No. 389,757. (No model.)

*To all whom it may concern:*

Be it known that we, WILLIAM LUCAS and THOMAS ALEXANDER GARRETT, both of London, England, have invented certain new and useful Improvements in Electrical Apparatus or Tell-Tales for Recording the Presence or Arrival of Watchmen, Workmen, or Others, of which the following is a specification.

The object of this invention is to provide simple and efficient apparatus whereby a watchman or other person can easily record that he has been present at a given place between two prearranged times or a workman or other person can record his arrival between two prearranged times.

In apparatus constructed according to our invention we take advantage of the well-known fact that the passage of an electric current through paper which has been prepared chemically in a suitable manner—such, for example, as paper used in some forms of recording telegraphic apparatus—produces a mark on the paper. In such apparatus an electrically-conducting style has been used.

The invention mainly consists in the combination of a stationary sheet or piece of chemically-prepared paper, a stationary conducting-plate, with which said paper is in contact, an electrically-conducting style or marker adapted for manual use, a battery or other source of electric current, the necessary wires or conductors, and a clock which automatically makes and breaks an electric connection at the prearranged times, whereby a signature or mark can be produced on the paper by means of the style or marker when the electric connection is made, but not when the connection is broken; also, an arrangement whereby at the will of an employer or superior and without the knowledge of the watchman or person whose presence or visits are to be recorded it can be easily arranged that the electric connection made by the clock will remain broken at a time or times when it is ordinarily completed, so that any attempt on the part of such watchman or person to record two visits at one time may be discovered.

The invention also comprises the combination, with said electrically-conducting style or marker, of a second electrically-conducting marker for marking the paper independently of the first-described style or marker; also, an arrangement whereby the paper can be moved intermittently forward by hand.

The invention comprises other improvements, which will be understood from the description hereinafter given.

Figure 11:
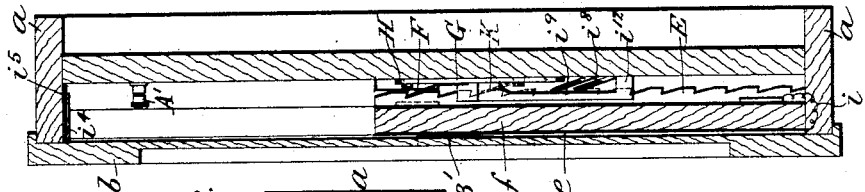
Figure 12:
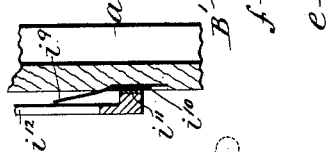
Figure 10:
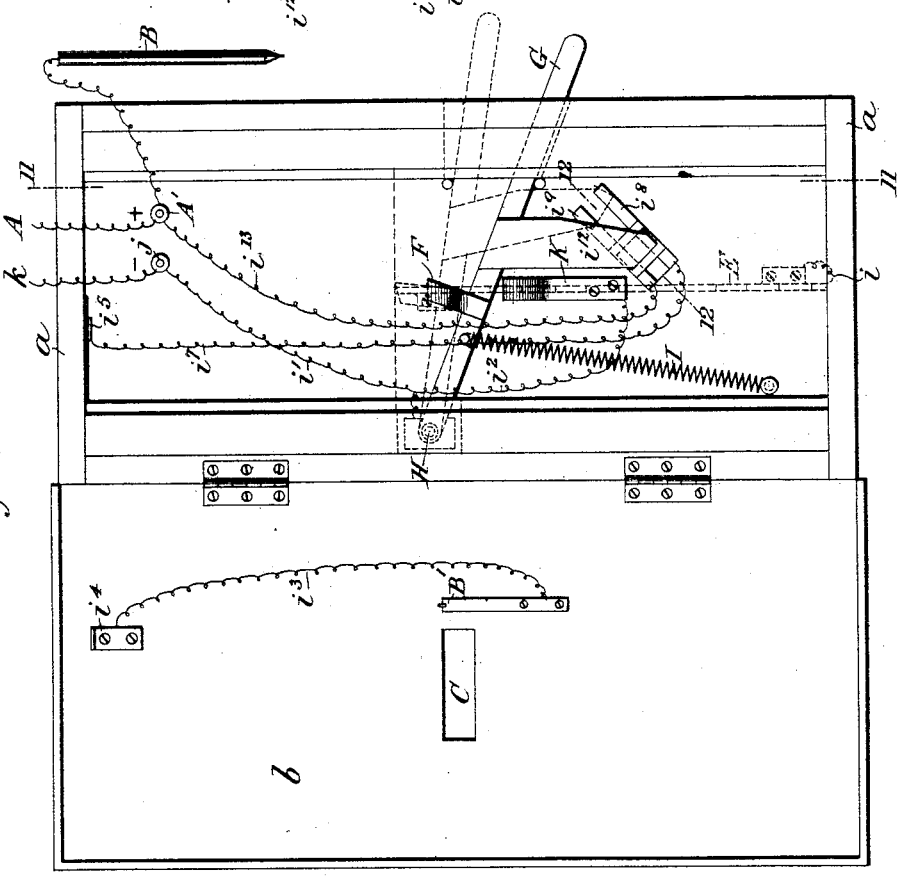

In the accompanying drawings, Figure 1 is a longitudinal mid-section of an apparatus constructed in accordance with our invention in the form which we prefer when it is intended to be employed for recording the arrival of workmen or others. Figs. 2 and 3 are respectively sections on lines 2 2 and 3 3 of Fig. 1. Fig. 4 is a plan with the lid of the containing-box open and thrown back. Figs. 5 to 9 illustrate a modified construction which we prefer when the apparatus is intended to be employed for recording the visits of watchmen, Fig. 5 being a front elevation of the clock portion of the apparatus, Fig. 6 a section on the line 6 6 of Fig. 5, Fig. 7 a plan of the recording part of the apparatus, Fig. 8 a section on the broken like 8 8 of Fig. 7, and Fig. 9 a diagrammatic view illustrating the connections between the clock portion and the recording portion of the apparatus, which portions may be situated at some distance from each other, the one being for example, in a private office and the other at a suitable position outside the building. Fig. 10 is a plan of another modified construction, the lid of the containing-box being shown open and thrown back. Fig. 11 is a section on the line 11 11 of Fig. 10, but with the lid closed. Fig. 12 is a section of part of the apparatus, on a larger scale, on the line 12 12 of Fig. 10.

Referring first to Figs. 1 to 4, *a* is a containing-box, which may be rectangular, as shown, or of any other suitable form, and be fitted with a lock and key.

*b* is the box-lid.

*c* is a hinged flap or cover to an opening in the lid above the chemically-prepared paper. This flap is shown open in Fig. 1.

*d* is the chemically-prepared paper, of which there may be either a single sheet or, as shown, a number of superposed sheets, so that the uppermost can be readily removed after use. The paper is preferably prepared by soaking it with a saturated solution of manganese nitrate in water. This being a deliquescent salt, the paper will remain moist.

$e$ is a conducting-plate upon which the paper $d$ is placed. This plate, which is preferably of aluminium, is carried by a wooden bed $f$, which can be lifted out of the box when desired.

$g$ is a loose board resting on ledges $h$ and is intended to support spare paper. It is, however, not essential.

$i\ i$ are screws or pins forming metallic connection between the plate $e$ and a metal strip or plate $j$ on the top of the body of the box. This plate $j$ is in connection by means of a wire $k$ with a spring metallic piece $l$ on the inside of the front of the box toward the left. In a like position toward the right is another spring metallic piece $m$, which is in connection by means of a wire $n$ with one pole of a battery $o$. This pole will be the negative pole when the paper above described is used.

$p$ is the clock, carried in a wooden case or frame $q$, which is preferably arranged so that it can be slid down into position just inside the front of the box, guides $r\ r$ being provided for the purpose. When in position, a metal plate $s$ on the clock-case $q$ is in contact with the metal piece $l$, while another metal plate $t$, also on the clock-case, is in contact with the other metal piece $m$. The plate $s$ is connected by a wire $u$ to a metal plate $v$, while the plate $t$ is connected by a wire $w$ to a plate $x$. It will thus be seen that the establishment of metallic connection between the plates $v$ and $x$ will complete metallic connection between the paper $d$ and the one pole of the battery $o$. This connection is completed and again broken at the prearranged times by means of the wires or metallic extensions $y$ and $z$ of the clock-hands. The position of the plate $x$, as shown in the drawings, is such that the wire $z$ on the hour-hand comes in contact therewith shortly before six o'clock and is again out of contact therewith shortly after six, and the position of the plate $v$ is such that the wire $y$ on the minute-hand comes in contact therewith at five minutes before six and is again out of contact therewith at five minutes after six. Thus between five minutes before six and five minutes past six the metallic connection between the paper $d$ and the one pole of the battery $o$ is complete. It therefore remains to complete the circuit with the other pole of the battery. For this purpose a wire A is led from the other pole to a style or marker B, having a conducting-point, which will generally be platinum. By bringing the style into contact with the paper $d$ the circuit is complete and any signature or mark can be produced on the paper by means of the style. After five minutes past six the electric circuit is broken, owing to the wire $y$ having passed out of contact with the plate $v$, and consequently any attempt subsequently made to mark the paper with the style will fail. Of course instead of the prearranged times for completing and breaking the electric connection at the clock, being five minutes before six and five minutes after six, any other desired time or times can be prearranged. It will be only necessary to alter the position of the plates $v$ and $x$.

In the apparatus shown in Figs. 1 to 4 the clock portion and the recording portion, with the necessary connections, are contained in one box. This is not, however, necessary.

In the modified construction shown in Figs. 5 to 9 the clock portion and the recording portion are shown as placed in different situations. In this modification the clock case or frame $q$ has at the back two metal plates $s$ and $t$, which when the clock is in situation are respectively in contact with two metallic spring-pieces (not shown) similar to the spring-pieces $l$ and $m$, Fig. 4. The plate $s$ is in connection on the one side through the corresponding metallic spring-piece with the recording apparatus by the wire $k$ and on the other side with the metal part of the clock by the wire $u$. The plate $t$ is in contact on the one side by a wire $w$ with a metal ring $x$ and on the other side, through the metallic spring-piece (not shown) and wire $n$, with the battery $o$. The ring $x$ is in metallic connection, as hereinafter described, with twelve bars $x'\ x'$, one for each hour of the dial, and the hour-hand carries a wire or metallic extension $z$, which makes contact for a few minutes before and after every hour with the corresponding bar $x'$, thereby completing the metallic connection between the one pole of the battery $o$ and the recording portion of the apparatus. The other pole of the battery is in electrical connection with the style B by the wire A, binding-screw A', and wire $A^2$. The chemically-prepared paper $d$ is carried by a conducting-plate $e$, which is itself carried by a wooden bed $f$. The plate $e$ is in connection by means of the iron wire $i$, binding-screw $j$, wire $k$, and the metallic spring-piece (not shown) with the plate $s$. The top or lid $b$ of the recording apparatus has a number of openings C C, of which six are shown, one for each hour that a watchman is required to make a visit. A number of separate openings is, however, not necessary, as a single opening with indications of the positions where signatures are to be made at the several hours will suffice. The wooden bed $f$ is shown as hinged to the under side of the top or lid $b$, so that it can be opened, as indicated by dots in Fig. 8, when it is required to remove the paper $d$. D represents a catch or fastening of any suitable kind to retain the bed $f$ in its normal position. The bars $x'$, Figs. 5 and 6, are secured to the clock-frame $q$ by means of tightening-nuts $x^2$, which screw onto screws $x^3$, fixed in the clock-frame $q$. These screws pass through holes $x^4$, of larger diameter than themselves, in the ring $x$, so as not to make direct metallic contact therewith. Upon the rear ends of the screws are nuts $x^5$, which when screwed up into contact with the ring $x$ make metallic contact between this ring and the screws $x^3$ and therefore the bars $x'$. It will thus be readily understood that by partly unscrewing one of the nuts $x^5$, so as to break the metallic connection between the ring $x$ and the corresponding screw $x^3$, the wire $z$ will not complete the electric circuit when it comes in contact with the corresponding bar $x'$, and therefore the watchman will not be able to make the corresponding record on the paper $d$. Consequently if, for example, an employer should put the twelve-o'clock bar $x'$ out of connection by unscrewing the corresponding nut $x^5$, as shown in the case of this nut in Fig. 6, and a watchman who failed to make his twelve-o'clock visit should record both a twelve-o'clock visit and a one-o'clock visit, as he would be able to do when he made a visit at one o'clock, his negligence would be discovered because of the fact that a record of a twelve-o'clock visit would appear on the paper $d$—a record which could not have been made at twelve o'clock. If instead of recording visits at the exact hours it should be desired to record them between the hours, say at half-past every hour, this can be provided for by slacking the nuts $x^2$ and moving the bars $x'$ on their pivots to the position of the sixth bar $x'$. (Indicated in dots in Fig. 5.) The wire $z$ will then come in contact with each bar about twenty-five minutes past every hour.

In the modified construction of apparatus represented in Figs. 10, 11, and 12 the paper and conducting-plate $e$ are arranged to be moved forward manually by the watchman or other person at each visit, and there is a second electrical conducting-marker, which marks the paper independently of the first marker, this marking being effected upon a part of the paper not visible to the watchman. The wooden bed $f$, which carries the conducting-plate $e$ and paper, has a longitudinal notched metal bar E at its under side, this bar being connected with the plate $e$ by the wire $i$. The bed $f$ and plate $e$ are supposed to be removed in Fig. 10 in order to show the parts below more clearly. In gear with the notched bar E is a metal pawl F on a metal lever G, pivoted at H and projecting at its free end through the front of the box $a$. It will thus be readily understood that by moving the lever G to the position indicated in dots in Fig. 10 the bed $f$, plate $e$, and paper will be moved a certain distance in the same direction. When pressure is removed from the lever G, it is returned to its former position by the spring I, while the bed $f$, plate $e$, and paper remain in the position to which they have been moved. The lever G is connected by a wire $i'$ to a binding-screw $j$, from which a wire $k$ leads to the clock portion of the apparatus, which may be the same as that shown in Figs. 5 and 6. A branch wire $i^2$ is also led from the wire $i$ to a spring metallic piece K in contact with the notched bar E. In contact with the paper is a marker of conducting material B' inside the lid $b$ and connected by a wire $i^3$ with a metal piece $i^4$, which when the lid is closed is in contact with a spring metallic piece $i^5$, from which a wire $i^7$ leads to a spring metallic piece $i^8$. Parallel but not in electrical connection with this piece $i^8$ is a similar piece $i^9$. Over these pieces $i^8$ $i^9$ is a piece of insulating material $i^{10}$, upon which a metal piece $i^{11}$ rests. This piece $i^{11}$ is connected by a wooden piece $i^{12}$ to the lever G, and consequently moves with this lever. When the lever is moved to the position shown in dotted lines, the metal piece $i^{11}$ leaves the insulating-piece $i^{10}$ and makes metallic contact between $i^8$ and $i^9$. The piece $i^9$ is connected by the wire $i^{13}$ to the binding-screw A', from which a wire A leads to the other pole of the battery. Consequently when the electric connection at the clock is complete the circuit is complete, except at the pieces $i^8$ and $i^9$, which are insulated from each other, and at the style B; but when the lever G is moved, and connection between $i^8$ and $i^9$ is therefore made by the metal piece $i^{11}$, the circuit through the marker B' is complete, and as the paper travels under the marker B' a line is drawn on the paper out of sight of the workman. Therefore if the employer breaks the connection corresponding with any particular hour, in the manner hereinbefore explained with reference to Figs. 5 and 6, and a watchman, having neglected to make his visit at that hour, endeavors to hide his neglect by moving the lever G twice at the following hour, the connection corresponding with which is not broken, a mark will be made which ought not to be there. The other or signature marker or style B is connected to the binding-screw A'. This style, however, instead of being an electrical style, may be an ordinary pencil, as the marker B' provides the necessary check.

It is obvious that in all the modifications, instead of the clock being arranged to make the connection between the battery and the paper, it can be arranged to make connection between the battery and the style or marker.

What we claim, and desire to secure by Letters Patent, is—

1. In an apparatus or tell-tale for recording the presence or arrival of watchmen or others, the combination of a battery or source of electricity, an electrically-conducting pencil or style adapted for manual use in connection with the one pole of said battery, a second electrically-conducting marker in connection with the same pole and in contact with chemically-prepared paper, said chemically-prepared paper, a conducting-plate with which said paper is in contact and adapted to be moved intermittently forward at will, together with said paper, and a time-keeper which at prearranged times automatically makes and breaks electrical connection between said conducting-plate and the other pole of said battery, whereby during the time that this connection exists a recording mark or signature can be made on said paper by means of said manual marker and a second recording mark can be made on said paper by the second marker if the conducting-plate and paper be made to move forward, substantially as and for the purpose set forth.

2. In an apparatus or tell-tale for recording the presence or arrival of watchmen, workmen, or others, the combination of the battery o, the electrically-conducting style B in connection with the one pole of said battery, the chemically-prepared paper d, the conducting-plate e, with which said paper is in contact, the metal plate v, metallic connections between said plates e and v, the metal plate x, metallic connections between plate x and the other pole of battery o, the time-keeper p, and the wires y and z, moving, respectively, with the minute and hour hands of said time-keeper and traveling at prearranged times, in contact, respectively, with the plates v and x, and thereby temporarily completing electrical connection between the paper d and the battery, substantially as and for the purpose set forth.

3. In an apparatus or tell-tale for recording the presence or arrival of watchmen, workmen, or others, the combination of the battery o, the electrically-conducting style B, the wire A, connecting said battery with said style, the chemically-prepared paper d, the conducting-plate e, the bed f, the screws or pins i i, the metal strip j, the metallic piece l, the wire k, connecting said strip j with said piece l, metal plate s, metal plate v, wire u, connecting said plate s with said plate v, time-keeper p, wires y z on the minute and hour hands, respectively, of said time-keeper, metal plate x, metal plate t, wire w, connecting said plate x with said plate t, metallic piece m, and wire n, connecting said piece m with the battery o, all substantially as hereinbefore described and shown, for the purposes set forth.

In witness whereof we have hereunto signed our names in the presence of two subscribing witnesses.

WILLIAM LUCAS.
THOMAS ALEXANDER GARRETT.

Witnesses:
JOHN C. MEWBURN,
GEORGE C. BACON.